United States Patent Office 3,728,326
Patented Apr. 17, 1973

3,728,326
HYPOCALCEMIC PEPTIDE AND PROCESS OF PREPARING IT USING A TWO-PHASE N-BUTANOL-PYRIDINE-ACETIC ACID-AMMONIUM ACETATE-WATER SYSTEM
Irving Putter, Martinsville, N.J., assignor to Merck & Co., Inc., Rahway, N.J.
No Drawing. Continuation of abandoned application Ser. No. 653,342, July 14, 1967. This application July 2, 1971, Ser. No. 159,559
Int. Cl. C07c *103/52;* C07g *7/10*
U.S. Cl. 260—112 T        11 Claims

ABSTRACT OF THE DISCLOSURE

This invention relates to a hypocalcemic peptide derived from thyroid gland, in pure form and defined composition. In accordance with the invention, the peptide is prepared by counter-current extraction of thyroid gland extract with a two-phase n-butanol-pyridine-acetic acid-water-ammonium acetate system. Further purification is effected by counter-current extraction with a two-phase n-butanol-water-acetic acid system. The invention also provides a process for treating thyroid glands using a two-phase n-butanol-pyridine-acetic acid-water-ammonium acetate system to produce thyroid gland extract suitable for use in said counter-current extractions.

---

This application is a continuation of application Ser. No. 653,342, filed July 14, 1967, and now abandoned.

BACKGROUND OF THE INVENTION

It is known that the thyroid gland of many mammals secretes and stores an agent or hormone having the ability to lower the calcium level of blood serum. This active hypocalcemic principle of the thyroid gland has been given the name "thyrocalcitonin" and has been postulated as being of value in the treatment of osteoporosis, such as that induced by treatment with steroids, as well as healing of broken bones, hypercalcemia, or other conditions in which it is desirable to reduce or regulate resorption of bone. However, the art has heretofore been unsuccessful in its attempts to obtain a hypocalcemic peptide agent from thyroid glands in pure form. The lack of pure peptide has greatly impeded useful work in this area, such as structural determination and clinical studies. It has also prevented routine use of the agent in human therapy because of the variability in activity which is inherent in impure samples and the possibility of immune, antigenic and allergenic reactions associated with the use of samples contaminated with glandular tissue, superfluous proteinaceous materials and the like.

SUMMARY OF THE INVENTION

This invention relates to novel hypocalcemic agents derived from thyroid glandular tissue and to the novel process for preparing the same.

In accordance with certain of its aspects, this invention provides a novel process for preparing a pure hypocalcemic peptide from thyroid glands. In accordance with certain of its other aspects, this invention provides said hypocalcemic peptide in pure form, essentially free from contaminating substances. The invention is useful in obtaining the hypocalcemic agent from mammalian thyroid glands, and especially porcine thyroid glands.

The novel process of this invention comprises extracting an impure extract of thyroid glands by counter-current extraction techniques, using in the extraction a two-phase solvent system derived from n-butanol-pyridine-water-acetic acid-ammonium acetate. While the precise relative amounts of the components of this system may be varied somewhat, it has been found that the best results are obtained when operating within the following proportions:

| Component | Range | Preferred |
|---|---|---|
| Pyridine, ml | 60–100 | 80 |
| n-Butanol, ml | 100 | 100 |
| Acetic acid, ml | 1.2–5 | 2.35 |
| Ammonium acetate, grams | 1–5 | 2.73 |
| Water, ml | 100–300 | 240 |

The system will desirably have a pH between 4 and 6, and preferably about 5.3.

The counter-current extraction system is most readily prepared by mixing the components together in the desired proportion and in large quantities, then allowing them to separate and separately drawing off the upper and lower layers to provide a stock of each layer. These stocks can then be drawn upon to provide the extraction system for each run.

The raw material employed in the counter-current extraction will preferably be a partially refined product rather than the crude glands, themselves, in order to minimize the amounts of solvents required. The trichloroacetic acid precipitate prepared from thyroid glands by the procedure of A. Tenenhouse et al. as described in Proc. Nat. Acad. Sci., 53, 818–822 (1965) is a satisfactory starting point for the purification.

When starting from the Tenenhouse et al. TCA powder, it is desirable, although not essential, to effect a gross purification before employing the counter-current extraction. A convenient method comprises ultra-filtration of an aqueous solution of the TCA powder through a Visking 8/32 cellulose casing at 4° C. at 25–50 mm. Hg to obtain a two to three-fold improvement in purity.

It has been found especially desirable to prepare the partially refined product used in the counter-current extraction by the simple extraction of defatted thyroid glands using a solvent system similar to that employed in the counter-current extraction, i.e. a two-phase n-butanol-pyridine-water-acetic acid-ammonium acetate solvent system. Best results are obtained when the extraction solvent system falls within the following relative proportions, although some deviation therefrom is possible:

| Component | Range | Preferred |
|---|---|---|
| Pyridine, ml | 60–100 | 80 |
| n-Butanol, ml | 100 | 100 |
| Acetic acid, ml | 1.2–5 | 2.35 |
| Ammonium acetate, grams | 1–5 | 2.73 |
| Water, ml | 100–300 | 240 |

The defatted thyroid glands are mixed with the desired five-component system and the mixture is filtered and allowed to separate. The partially refined hypocalcemic extract is then recovered by isolating the upper solvent layer and freeze-drying it to recover the dissolved solids. A still higher degree of efficiency in obtaining partially refined hypocalcemic extract is realized by subjecting the defatted glands to a series of simple extractions with fresh portions of the extraction solvent system. The partially refined hypocalcemic agent is then recovered by combining the upper liquid layers from all of the extractions and freeze-drying them. If desired, the yield of partially refined material can be maximized by combining the lower layers from all of the extractions and extracting them with a quantity of fresh upper layer from stock supplies of the final extraction system. Other variations in the procedure may also be employed. For example, the defatted glands may be separately extracted with the upper phase of the system and the extract so obtained then treated with a suitable portion of lower phased. The precise total quantities of solvent system employed in each extraction are not critical, but will be chosen to provide enough solvent to facilitate handling of the solids employed without unduly increasing the amount of solvent to be evaporated. It has been found that the use of this solvent extraction technique in place of the aforementioned Tenenhouse et al. procedure permits attainment of significantly increased yields of pure hypocalcemic peptide.

In the practice of the invention, the partially refined material is subjected to counter-current extraction with the previously described solvent systems. As previously stated, this is most readily effected by first preparing stock samples of both the upper and lower phases of the extraction system. Counter-current extraction is carried out either manually or automatically, by either upper-phase or lower-phase transfer. For example, a series of extraction tubes are partially filled with the upper phase of the extraction solvent. The partially refined material is then dissolved in a sufficient quantity of mixed upper and lower layers of the extraction system and this mixture is placed in the first tube of the counter-current extraction apparatus. Typically, the amount of solvent system used will be sufficient to give a concentration of about 0.5–10% by weight, say 3–5% by weight solids in the first tube of the apparatus. It is generally convenient to use approximately equal volumes of upper and lower phase in the first tube, although substantial departure from this ratio is permissible. This tube is thoroughly shaken, then allowed to separate, and the lower phase is withdrawn and added to the second tube. An equal volume of lower phase is then added to the first tube and both tubes are shaken and allowed to separate. This process is repeated in the same manner, progressing from tube to tube, as often as necessary to effect the desired degree of purification. In order to check on the degree of purity obtained, the upper and lower layers of each tube are separately lyophilized, and each sample so obtained is weighed and bioassayed for hypocalcemic activity. After a minimum number of transfers or "stages" generally of the order of about four, it is found that the bulk of the solids are concentrated in one series of tubes while the maximum hypocalcemic activity is found in the upper or "solvent" phases of a different series of tubes, due to the solubility distribution of the active material and the inactive contaminants in the two phases of the extraction system. If desired, the extraction sequence can be continued for a very large number of stages until the desired hypocalcemic peptide is obtained in high purity. However, since the original partially refined material contains a large quantity of inactive material, a relatively large quantity of extraction solvent system must be used in the initial counter-current extraction. It is, therefore, more efficient to carry the first counter-current extraction only to the point where the active material is distinctly separated from the bulk of the solids and to isolate the fractions showing maximum hypocalcemic activity for further purification. Typically, this first counter-current extraction will produce a five to fifty-fold improvement in purity.

Preferably, the fractions of maximum activity from the first counter-current extraction are recovered and subjected to further purification by a second series of counter-current extractions. They may be so employed directly as recovered or may be lyophilized, if desired, to further reduce the amount of solvent system to be handled. In either case, the second counter-current extraction is performed with the same type of five-component solvent system as previously described. As in the first extraction, it is generally desirable to have a concentration of about 0.5–10%, say 3–5% solids in the first tube, and approximately equal volumes of upper and lower phase. The second counter-current extraction is then carried out, either manually or automatically, and by either upper-phase or lower-phase transfer, until the desired degree of separation is achieved, as shown by analyzing the separate tubes for total solids and hypocalcemic activity. Preferably, this process will be continued for a sufficient number of transfers to produce a five to fifty-fold improvement in purity over the material obtained from the first counter-current extraction. This will typically require at least about 100 transfers. The hypocalcemic agent is then located by lyophilizing the contents of each tube of the apparatus and bioassaying for hypocalcemic activity.

The active material obtained from counter-current extraction with the five-component extraction system is in a highly concentrated state, but typically requires further refinement to produce the hypocalcemic agent in its pure form. In accordance with this invention, further purification is preferably achieved by subjecting the so-concentrated active material to further counter-current extraction with a three-component extraction system composed of n-butanol, water and acetic acid. As in the previously described extraction systems, some variation in the proportions of the components is permissible, but it is generally found that the following give the best purification with the smallest number of transfers:

| Component | Range | Preferred |
|---|---|---|
| n-Butanol, ml | 20 | 20 |
| Acetic acid, ml | 0.1–5 | 1 |
| Water, ml | 10–30 | 20 |

Counter-current extraction is again carried out as described above, preferably using stock supplies of the upper and lower phases of the particular system chosen. The preferred concentration of solids in the first tube is generally of the order of about 0.2–5%, say 1–2%. The extraction is preferably continued for a minimum of at least about 10 transfers, which will produce about a two to ten-fold improvement in purity. It is frequently found that this system produces emulsions upon shaking, but these are readily separated by centrifuging. The hypocalcemic agent is located by isolating the contents of each extraction vessel and submitting them for bioassay. Samples showing the highest degree of hypocalcemic activity are then collected and combined.

In the practice of this invention, it is preferable first to carry out counter-current extraction with the five-component extraction system and thereafter carry out counter-current extraction with the three-component extraction system. However, these steps may also be reversed, if desired, and the three-component system may be employed first, so long as the combination of both systems is employed.

It will generally be found that the samples so collected are still somewhat contaminated by impurities derived from the solvents used. For this reason, it is highly desirable to subject the material to a final purification step by column chromaography or gel filtration, using a suitable substrate and solvent. It is possible to use any of the substrates normally employed for fractionating peptides, such as polyacrylamide gels such as that sold under the trademark Biogel P-6, sulfonated resins such as that sold under the trademark Sulfoethyl Sephadex C-25, and cross-linked dextrans such as those sold under the trademarks Sephadex G-100, Sephadex G-50, Sephadex G-25 and Sephadex G-75. As the solvent and eluting agent, there are preferably used aqueous solutions having a pH below about 5, and preferably between 3 and 5. These may be buffered or simple solutions of organic or inorganic acids. Acetate buffers and acetic acid solutions are especially convenient. Fractions of the column effluent are collected and the hypocalcemic peptide is located by lyophilizing the fractions and bioassaying.

In general, exposure to heat during any of the described processing steps will cause a degradation of activity of the product. It is, therefore, desirable to operate at a low temperature throughout the process, and preferably below about 5° C. In order to minimize the introduction of contaminants through the solvents employed, it is desirable to use the purest grade of each solvent which is available.

It is found that hypocalcemic agent obtained from the described combination of counter-current extractions and column chromatography is a pure polypeptide having a definable composition. This peptide is believed to be the hypocalcemic principle designated by the name thyrocalcitonin but differs significantly from materials previously described as thyrocalcitonin in purity, activity, composition, electrophoretic mobility and chromatogram characteristics.

The purity of the recovered peptide is shown in a number of ways. Ultraviolet and refractive index analyses of the column effluent give a single Gaussian curve. Thin layer chromatography on silica gel G gives a single component using n-butanol-water-acetic acid and n-butanol-pyridine-acetic acid-water and the non-specific amide detection reagent of H. N. Rydon et al., Nature, 169, 922 (1952). Electrophoresis on cellulose acetate strips at pH 7 and 9 also give single zones with the same non-specific amide detection reagent.

Acid hydrolysis of the peptide with 6 N hydrochloric acid at 120° C. for one hour, before and after oxidation with performic acid gives the following results (micromoles/mg): histidine (0.30, 0.30); arginine (0.59, 0.56); aspartic acid (1.19, 1.22); glutamic acid (0.30, 0.34); threonine (0.59, 0.61); serine (1.17, 1.26); proline (0.62, 0.56); glycine (0.90, 0.94); alanine (0.33, 0.33); ½ cystine (0.41, 0.00); cysteic acid (0.00, 0.65); valine (0.30, 0.31); methionine (0.28, 0.00); leucine (0.90, 0.93); tyrosine (0.30, 0.21); phenylalanine (0.92, 0.93); ammonia (1.67, 5.16). Spectrophotometric studies in 0.01 N hydrochloric acid give maxima at $$288 \text{ m}\mu \ (E_{1\%}^{1 \text{ cm.}} \ 13.3) \text{ and at } 275 \text{ m}\mu \ (E_{1\%}^{1 \text{ cm.}} \ 17.8)$$

thus showing the presence of 1 mole of tryptophane. No lysine or isoleucine is found.

Treatment with leucineaminopeptidase does not cause hydrolysis of the peptide, thus showing the absence of free terminal primary amino groups. This is also confirmed by reacting the peptide with the Dansyl reagent (5 - dimethylamino - 1 - naphthalenesulphonyl chloride), followed by acid hydrolysis and thin layer chromatography. The only dansylated product found is O-dansyl-tyrosine.

Electrophoretic mobility studies show a net charge of 3+ at pH 2, 2+ at pH 5, and 1+ at pH 9, thus showing that only one of the six potential carboxyl groups is present as the free acid.

From the above findings, it is concluded that the pure hypocalcemic agent of this invention is a peptide having a molecular weight of about 3650, containing one free carboxyl group and being substantially free of terminal primary amine groups. The peptide contains 32 amino acid moieties in the following molar proportions, as shown by acid hydrolysis:

| | | | |
|---|---|---|---|
| histidine | 1 | alanine | 1 |
| arginine | 2 | valine | 1 |
| aspartic acid | 4 | methionine | 1 |
| threonine | 2 | leucine | 3 |
| serine | 4 | tyrosine | 1 |
| glutamic acid | 1 | phenylalanine | 3 |
| proline | 2 | ½ cystine | 2 |
| glycine | 3 | tryptophane | 1 |

The pure peptide is a white to off-white dry material which shows hypocalcemic activity in rats at a dosage as low as about 1 nanogram per rat by intravenous assay. In carrying out this assay, intact young rats were fasted for 24 hours, then injected intravenously with the hypocalcemic agent at a range of dose levels. After one hour, the experimental and control rats were bled by cardiac puncture and the serum analyzed for calcium by standard analytical procedures. The dosages given were plotted, on logarithmic paper, again the response observed in reduction of calcium levels, expressed in milligram percent (mg. Ca per 100 ml. of serum). A straight line was drawn through the points and the dosage required to produce a reduction of 1 milligram percent was determined. This value was designated as the "dosage needed to produce a standard response."

The pure peptide is useful in the treatment of humans for various hypercalcemic conditions, such as idiopathic hypercalcemia, osteoporosis and other conditions which require reduction of bone resorption. Because of its high purity, routine treatment is feasible. For human therapy, the peptide is preferably administered by intravenous or subcutaneous injection, together with a parenterally acceptable carrier or excipient. The most suitable carriers are water or saline solutions, but other common pharmaceutical carriers can be substituted. Preferably, the peptide will be present in the carrier in an amount sufficient to give the desired dose in about 0.5 ml. of injectable fluid. The pure peptide in humans is effective in doses as low as about 5 micrograms for a single administration and normal daily doses will range from about 0.005 milligram to about 0.5 milligram. The peptide can be administered in a single daily dose, or by two or more fractional doses per day, or by continuous infusion. At lower daily dosage rates, it can be administered once every two or three days or even less frequently. Use of the peptide in this manner results in a rapid and controlled reduction in plasma calcium, with no known observable adverse side-effects.

Practice of illustrative embodiments of the instant invention may be observed from the following specific examples.

EXAMPLE 1

A stock supply of extraction solvent system is prepared from 80 ml. pyridine, 100 ml. of n-butanol, 2.4 ml. of acetic acid, 2.78 grams of ammonium acetate, and 240 ml. of water. Three ml. of the upper phase of said stock solution is placed in each of eight extraction tubes. Sixty milligrams of partially refined thyroid extract derived from porcine thyroid glands by the process of Tenenhouse et al. previously described, followed by ultrafiltration, is dissolved in 3 ml. each of the upper and lower phases of the solvent system and placed in the first tube. A counter-current extraction is performed by lower phase transfer for a total of eight transfers. The contents of each tube are recovered and lyophilized and submitted for bioassay by the procedure described above. The total solids recovered and the activity for each sample are shown in Table I. The initial feed had a weight of 60.0 milligrams and required a dosage of 10 micrograms to produce the standard response.

TABLE I

| Tube number | Weight (milligrams) | Dose required for standard response (micrograms) |
|---|---|---|
| 1 | 1.0 | 0.3 |
| 2 | 2.0 | 2.0 |
| 3 | 4.0 | 5.0 |
| 4 | 1.5 | 5.0 |
| 5 | 4.0 | 50 |
| 6 | 12.0 | >100 |
| 7 | 16.0 | >100 |
| 8 | 20.0 | >100 |

As can be seen from Table I, the 8-transfer counter-current extraction results in clear separation of the hypocalcemic agent from the bulk of the solids contained in the partially refined material.

EXAMPLE 2

A large quantity of the solvent system described in Example 1 is prepared, and fifty ml. of upper phase is placed in each of eight extraction tubes. A sample of 2.50 grams of partially refined thyroid extract prepared according to the process of Tenenhouse et al., followed by ultrafiltration, is dissolved in 50 ml. each of upper and lower phase of the solvent system. Counter-current extraction is then carried out for eight transfers using lower-phase transfer. The upper and lower phases of each tube are separately collected, lyophilized, and submitted for bioassay. The results are as shown in Table II. The initial feed material has a weight of 2.50 grams and requires a dosage of 15 micrograms to produce the standard response.

TABLE II

| Tube (phase/tube number) | Weight (milligrams) | Dose required for standard response (micrograms) |
| --- | --- | --- |
| Upper/1 | 18.5 | 0.3 |
| Upper/2 | 27.4 | 0.5 |
| Upper/3 | 34.6 | 1.5 |
| Upper/4 | 50.0 | >10 |
| Upper/5 | 57.5 | >10 |
| Upper/6 | 97.5 | >10 |
| Upper/7 | 90.0 | >10 |
| Upper/8 | 85.0 | >10 |
| Lower/1 | 12.5 | >10 |
| Lower/2 | 22.5 | >10 |
| Lower/3 | 47.5 | >10 |
| Lower/4 | 100.0 | >10 |
| Lower/5 | 88.5 | >10 |
| Lower/6 | 410.0 | >10 |
| Lower/7 | 415.0 | >10 |
| Lower/8 | 820.0 | >10 |

From Table II, it can be seen that the hypocalcemic agent is concentrated in the upper phases of the first three tubes of the extraction system, whereas the bulk of solid material initially introduced is present in the lower phases of all tubes and the upper phase of tubes 4 through 8. Thus, the eight-transfer counter-current extraction permits clean separation of the bulk of the active material from the bulk of the solids introduced.

EXAMPLE 3

Four extraction systems are prepared as shown in Table III.

TABLE III

| Component | System 1 | System 2-3 | System 4 |
| --- | --- | --- | --- |
| Pyridine, 1 | 63.8 | 39.8 | 19.9 |
| n-Butanol, 1 | 80.2 | 50.2 | 25.1 |
| Water, 1 | 187 | 120.3 | 59.1 |
| Ammonium acetate, grams | 2,180 | 1,364 | 687 |
| Glacial acetic acid, 1 | 1.84 | 1.18 | .59 |

Thirty kilograms of defatted porcine thyroid glands are mixed with system 1 and agitated for one hour. The resulting mixture is filtered, the filtrate allowed to separate, and the upper and lower phases are separately isolated. The solid material is then extracted, in sequence, with systems 2 and 3 and the filtrate separated and isolated in the same manner. The lower layers from systems 1, 2 and 3 are combined and extracted with system 4. The four upper layers are then combined and lyophilized to produce thyroid extract suitable for use in the counter-current extraction of Examples 1 and 2.

EXAMPLE 4

A large quantity of extraction solvent is prepared according to the composition of Example 1. 61.9 grams of thyroid extract prepared in accordance with Example 3 is dissolved in 1 liter of upper phase and 500 ml. of lower phase of the solvent system. The mixture is filtered and washed with a mixture of 200 ml. of upper phase and three 25 ml. portions of lower phase. The total filtrate is adjusted to give a volume of 1200 ml. of upper phase and 600 ml. of lower phase. The filtrate is used as the first tube in a 5-tube counter-current extraction using 12 transfers of lower phase, following an alternate withdrawal system. At the completion of the counter-current extraction, tubes 1 through 5 contain upper phase in which there is present the bulk of the hypocalcemic agent. These are concentrated in vacuo almost to dryness and then lyophilized. The residues are dissolved in 0.1 M acetic acid and relyophilized. The results obtained are shown in Table IV.

TABLE IV

| Tube number | Weight (grams) | Dose required for standard response (micrograms) |
| --- | --- | --- |
| 1 | 1.356 | 0.5 |
| 2 | 1.710 | 0.8 |
| 3 | 1.699 | 1.3 |
| 4 | 1.260 | 1.8 |
| 5 | 0.955 | 10 |

EXAMPLE 5

The material isolated from the first two tubes of the counter-current extraction described in Example 4 is dissolved in 50 ml. each of upper and lower phase of the solvent system employed in Example 1 and placed in the first two tubes of an automatic counter-current extraction train containing 103 tubes, each having a capacity of 50 ml. of combined upper and lower phase. Counter-current extraction is carried out employing a program of 2 minutes agitation and 15 minutes separation. First, 62 transfers are carried out using upper phase transfer. This is followed by 12 additional transfers of alternate upper and lower phases. Finally, an additional 191 transfers of upper phase are carried out. The upper phase emerging from the apparatus is collected in fractions and lyophilized to give the results shown in Table V.

TABLE V

| Sample | Tube number | Weight (milligrams) | Dose required for standard response (micrograms) |
| --- | --- | --- | --- |
| A | 99-110 | 22 | 0.19 |
| B | 111-130 | 549 | 0.055 |
| C | 131-140 | 479 | 0.20 |
| D | 141-160 | 1,053 | 3.0 |

EXAMPLE 6

A counter-current extraction solvent system is made up by combining 100 ml. of n-butanol, 100 ml. of water and 5 ml. of acetic acid and allowing the mixture to separate. 520 milligrams of Sample B from Example 5 is dissolved in 17 ml. each of upper and lower phase of this solvent system. The sample so prepared constitutes the first tube for a 15-tube counter-current extraction. Extraction is carried out for 15 lower phase transfers, after which the contents of each tube are lyophilized and bioassayed to give the results given in Table VI.

TABLE VI

| Tube number | Weight (milligrams) | Dose required for standard response (micrograms) |
| --- | --- | --- |
| 1 | 40.7 | (1) |
| 2 | 7.8 | (1) |
| 3 | 3.2 | (1) |
| 4 | 2.4 | 0.045 |
| 5 | 3.2 | 0.070 |
| 6 | 3.0 | 0.060 |
| 7 | 4.8 | 0.029 |
| 8 | 5.0 | 0.020 |
| 9 | 9.1 | 0.030 |
| 10 | 12.7 | 0.030 |
| 11 | 22.5 | 0.020 |
| 12 | 48.4 | 0.030 |
| 13 | 66.2 | 0.070 |
| 14 | 173.4 | 5.0 |
| 15 | 171.6 | >20 |

[1] Not determined.

The material from tubes 5 through 11 are combined and dissolved in 1 ml. of 0.4 M-acetic acid. This solution is chromatographed on a column of Biogel P-6 (1.3 cm. x 224 cm.), 50–150 mesh using 0.4 M-acetic acid as the elution solvent. The effluent is recorded at 253 mμ on LKB Uvicord self-recording spectrophotometer and a Waters Associates differential refractometer. In all, eighty fractions of 5.2 ml. each are collected. Fractions 35–47 are combined, and concentrated in vacuo to a volume of 2 ml., then freeze-dried to yield 27.7 mg. of hypocalcemic agent. Repeated chromatography on the same column, in the same manner as previously described, gives, after lyophilization, 12.3 mg. of pure hyopcalcemic peptide. The pure peptide has the characteristics and composition hereinbefore described and has produced a standard response in rats at a dosage of 3 nanograms.

I claim:

1. The process for preparing hypocalcemic peptide from thyroid glands which comprises subjecting impure thyroid extract to counter-current extraction with a two-phase solvent system consisting essentially of pyridine, n-butanol, acetic acid, ammonium acetate and water in the proportions of 60–100 ml. of pyridine, 100 ml. of n-butanol, 1.2–5 ml. of acetic acid, 100–300 ml. of water and 1–5 grams of ammonium acetate, and recovering hypocalcemic peptide from selected fractions of the upper phase having hypocalcemic activity.

2. The process of claim 1 wherein said counter-current extraction is carried out for at least four transfers.

3. The process of claim 1 wherein said thyroid glands are porcine thyroid glands.

4. The process of claim 1 wherein the two-phase system consists of about 80 ml. of pyridine, about 100 ml. of n-butanol, about 2.35 ml. of acetic acid, about 240 ml. of water, and about 2.73 grams of ammonium acetate.

5. The process of claim 4 wherein said thyroid glands are porcine thyroid glands.

6. The process for preparing hypocalcemic peptide from thyroid glands which comprises subjecting impure thyroid extract to a first counter-current extraction with a two-phase extraction system; recovering from the upper phases of said first counter-current extraction the fractions of highest hypocalcemic activity; and subjecting said fractions showing highest hypocalcemic activity to a second counter-current extraction with a two-phase extraction system; wherein the two-phase extraction systems of said first counter-current extraction and said second counter-current extraction consist essentially of pyridine, n-butanol, acetic acid, water and ammonium acetate in the proportions of 60–100 ml. of pyridine, 100 ml. of n-butanol, 1.2–5 ml. of acetic acid, 100–300 ml. of water, and 1–5 grams of ammonium acetate, and recovering hypocalcemic peptide from selected fractions of the upper phase having hypocalcemic activity.

7. The process of claim 6 wherein said first counter-current extraction is carried out for at least four transfers and said second counter-current extraction is carried out for at least about 100 transfers.

8. The process of claim 6 wherein said thyroid glands are porcine thyroid glands.

9. The process of claim 6 wherein the extraction systems of said first counter-current extraction and said second counter-current extraction consist essentially of pyridine, n-butanol, acetic acid, water and ammonium acetate in the proportions of about 80 ml. of pyridine, about 100 ml. of n-butanol, about 2.35 ml. of acetic acid, about 240 ml. of water and about 2.73 grams of ammonium acetate.

10. The process for preparing pure hypocalcemic peptide from thyroid glands which comprises subjecting impure thyroid extract to (i) counter-current extraction with a two-phase extraction system consisting essentially of pyridine, n-butanol, acetic acid, water and ammonium acetate in the proportions of 60–100 ml. of pyridine, 100 ml. of n-butanol, 1.2–5 ml. of acetic acid, 100–300 ml. of water, and 1–5 grams of ammonium acetate, and recovering hypocalcemic peptide from selected fractions of the upper phase; (ii) subjecting said hypocalcemic peptide to counter-current extraction with a two-phase extraction system consisting essentially of n-butanol, acetic acid and water in the proportions of 20 ml. of n-butanol, 0.1–5 ml. of acetic acid and 10–30 ml. of water, and recovering purified hypocalcemic factor from selected fractions of the upper phase; and subjecting said purified hypocalcemic factor to chromatography over a polyacrylamide gel, eluting the gel adsorbate with 0.4 M acetic acid and recovering pure hypocalcemic factor from selected fractions of the eluate having hypocalcemic activity.

11. Hypocalcemic peptide obtained by the process of claim 10 and further characterized as follows:
    (a) having a molecular weight of about 3650;
    (b) containing one free carboxyl group and being substantially free of terminal primary amine groups; and
    (c) yielding on acid hydrolysis the following amino acids in the respective molar proportions: (1) histidine, (2) arginine, (4) aspartic acid, (2) threonine, (4) serine, (1) alanine, (1) valine, (1) methionine, (3) leucine, (1) throsine, (1) glutamic acid, (2) proline, (3) glycine, (3) phenylalanine, (2) ½ cystine, (1) tryptophane; and
    (d) having hypocalcemic activity in rats at a dosage as low as about 1 nanogram per rat by intravenous assay.

References Cited

UNITED STATES PATENTS 3,590,027   6/1971   Grinnan et al. _____ 260—112

OTHER REFERENCES

Federation Proceedings, 26, p. 392, March 1967, Hawker et al.

Journal of Biological Chemistry, vol. 236, 1961, Rasmussen et al., pp. 759–764.

Biochimica et Biophysica Acta, vol. 56, 1962, Rasmussen et al., pp. 332–337.

Proceedings of the Royal Society (London), April 1966, pp. 460–463, Gudmundsson et al.

Proceedings of the National Academy of Science, 53, pp. 818–22, 1965, Tenenhouse et al.

HOWARD F. SCHAIN, Primary Examiner

U.S. Cl. X.R.

260—112 R, 112.5; 424—111, 177